(12) United States Patent
Shires et al.

(10) Patent No.: US 9,035,996 B1
(45) Date of Patent: *May 19, 2015

(54) MULTI-DEVICE VIDEO COMMUNICATION SESSION

(71) Applicant: Google Inc., Mountain View, CA (US)

(72) Inventors: Glen Shires, Danville, CA (US); Maryam Garrett, Boston, MA (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/185,879

(22) Filed: Feb. 20, 2014

Related U.S. Application Data

(63) Continuation of application No. 13/447,488, filed on Apr. 16, 2012, now Pat. No. 8,681,954.

(51) Int. Cl.
*H04N 7/14* (2006.01)
*H04N 7/15* (2006.01)

(52) U.S. Cl.
CPC ..................... *H04N 7/152* (2013.01)

(58) Field of Classification Search
USPC ................. 348/14.01, 14.08; 379/93.21, 158, 379/202.01; 704/251
See application file for complete search history.

(56) References Cited

U.S. PATENT DOCUMENTS

| | | |
|---|---|---|
| 2007/0206086 A1* | 9/2007 | Baron et al. ............... 348/14.01 |
| 2009/0292768 A1 | 11/2009 | Franke |
| 2010/0141655 A1 | 6/2010 | Belinsky et al. |
| 2011/0040562 A1 | 2/2011 | Doyle et al. |
| 2011/0131144 A1 | 6/2011 | Ashour et al. |
| 2012/0110096 A1 | 5/2012 | Smarr et al. |
| 2013/0227006 A1 | 8/2013 | Raju |
| 2013/0275504 A1 | 10/2013 | Patel et al. |
| 2014/0028786 A1* | 1/2014 | Piccionielli ................. 348/14.08 |

* cited by examiner

*Primary Examiner* — Olisa Anwah
(74) *Attorney, Agent, or Firm* — Patent Law Works LLP

(57) ABSTRACT

A method of adding a computing device to a multi-device video communication session. A server receives recorded content from a plurality of multi-device video communication sessions and a search request from a computing device. The server identifies a first multi-device video communication session based on the search request. The first multi-device video communication session includes a weighted list of text elements. The server transmits information based on the weighted list of text elements to the computing device, receives a selection from the computing device corresponding to a first text element, and transmits at least a portion of the recorded content from the first multi-device video communication session to the computing device based on the first text element. The server receives an add request for the computing device to be added to the first multi-device video communication session and transmits the add request to the first multi-device video communication session.

18 Claims, 5 Drawing Sheets

MULTI-DEVICE VIDEO COMMUNICATION SESSION

CROSS-REFERENCE TO RELATED APPLICATIONS

The present application is a continuation of and claims priority under 35 USC §120 to U.S. application Ser. No. 13/447,488, filed Apr. 16, 2012, entitled "Multi-Device Video Communication Session". The entire contents of the foregoing are incorporated by reference herein.

TECHNICAL FIELD

The present invention relates in general to multi-device video communication sessions and in particular to adding a computing device to a multi-device video communication session.

BACKGROUND

Computing devices such as mobile telephones, tablets, laptops, and desktops have become widely available in recent years. These devices can be equipped with processors, memory, and the capability to communicate through local and wide area networks, including the Internet. These devices can also be equipped with output devices such as displays, image-sensing devices, and sound-sensing devices allowing the device user to record content, display content, and communicate recorded content to other computing devices and other device users. Many device users take part in social networks or video conferencing applications that allow multiple devices to communicate recorded content to each other within the same session, a multi-device video communication session. As multi-device video communication sessions proliferate, device users need a method to identify and join sessions of interest.

SUMMARY

Systems and methods for adding a computing device to a multi-device video communication session are disclosed.

In one implementation, a method of adding a computing device to a multi-device video communication session includes receiving recorded content from a plurality of multi-device video communication sessions, receiving a search request from the computing device, and identifying a first multi-device video communication session from the plurality of multi-device video communication sessions based on the search request from the computing device. The first multi-device video communication session includes a weighted list of text elements.

The method further includes transmitting information based on the weighted list of text elements to the computing device for causing the computing device to display a representation of the weighted list of text elements, receiving a selection from the computing device corresponding to a first text element from the weighted list of text elements, and transmitting at least a portion of the recorded content from the first multi-device video communication session to the computing device based on the first text element. The method further includes receiving an add request from the computing device that the computing device be added to the first multi-device video communication session and transmitting the add request to the first multi-device video communication session for causing the first multi-device video communication session to display a representation of the add request.

In another implementation, a method of adding a computing device to a multi-device video communication session includes sending a search request from the computing device and receiving information from the multi-device video communication session based on the search request. The multi-device video communication session includes recorded content and a weighted list of text elements. The method further includes displaying a representation of the weighted list of text elements on the computing device, receiving a selection corresponding to a first text element from the weighted list of text elements, receiving at least a portion of the recorded content from the multi-device video communication session based on the first text element, and sending an add request from the computing device that the computing device be added to the multi-device video communication session.

In another implementation, a multi-device video communication system is disclosed. The system includes a server configured to communicate with a computing device. The server includes a memory and one or more processors wherein the one or more processors are configured to execute instructions stored in the memory to receive recorded content from a plurality of multi-device video communication sessions, receive a search request from the computing device, and identify a first multi-device video communication session from the plurality of multi-device video communication sessions based on the search request from the computing device. The first multi-device video communication session includes a weighted list of text elements.

The processors are further configured to transmit information based on the weighted list of text elements to the computing device for causing the computing device to display a representation of the weighted list of text elements, receive a selection from the computing device corresponding to a first text element from the weighted list of text elements, and transmit at least a portion of the recorded content from the first multi-device video communication session to the computing device based on the first text element. The processors are further configured to receive an add request from the computing device that the computing device be added to the first multi-device video communication session and transmit the add request to the first multi-device video communication session for causing the first multi-device video communication session to display a representation of the add request.

In another implementation, a computing device is disclosed. The computing device includes an output device, a memory, and one or more processors. The one or more processors are configured to execute instructions stored in the memory to send a search request and receive information from a multi-device video communication session based on the search request. The multi-device video communication session includes recorded content and a weighted list of text elements. The processors are further configured to display a representation of the weighted list of text elements on the output device, receive a selection corresponding to a first text element from the weighted list of text elements, receive at least a portion of the recorded content from the multi-device video communication session based on the first text element, and send an add request that the computing device be added to the multi-device video communication session.

BRIEF DESCRIPTION OF THE DRAWINGS

The description here makes reference to the accompanying drawings where like reference numerals refer to like parts throughout the several views, and where.

DETAILED DESCRIPTION

In the multi-device video communication system and methods described here, device users can join multi-device video communication sessions using independent devices. A plurality of multi-device video communication sessions can be in progress at the same time, each session between a plurality of device users. A device user seeking to join an in-progress multi-device video communication session can implement the methods described here to identify a multi-device video communication session of interest and have an add request sent to the multi-device video communication session. Upon acceptance of the add request, the device user can join the in-progress multi-device video communication session.

Figure 1:
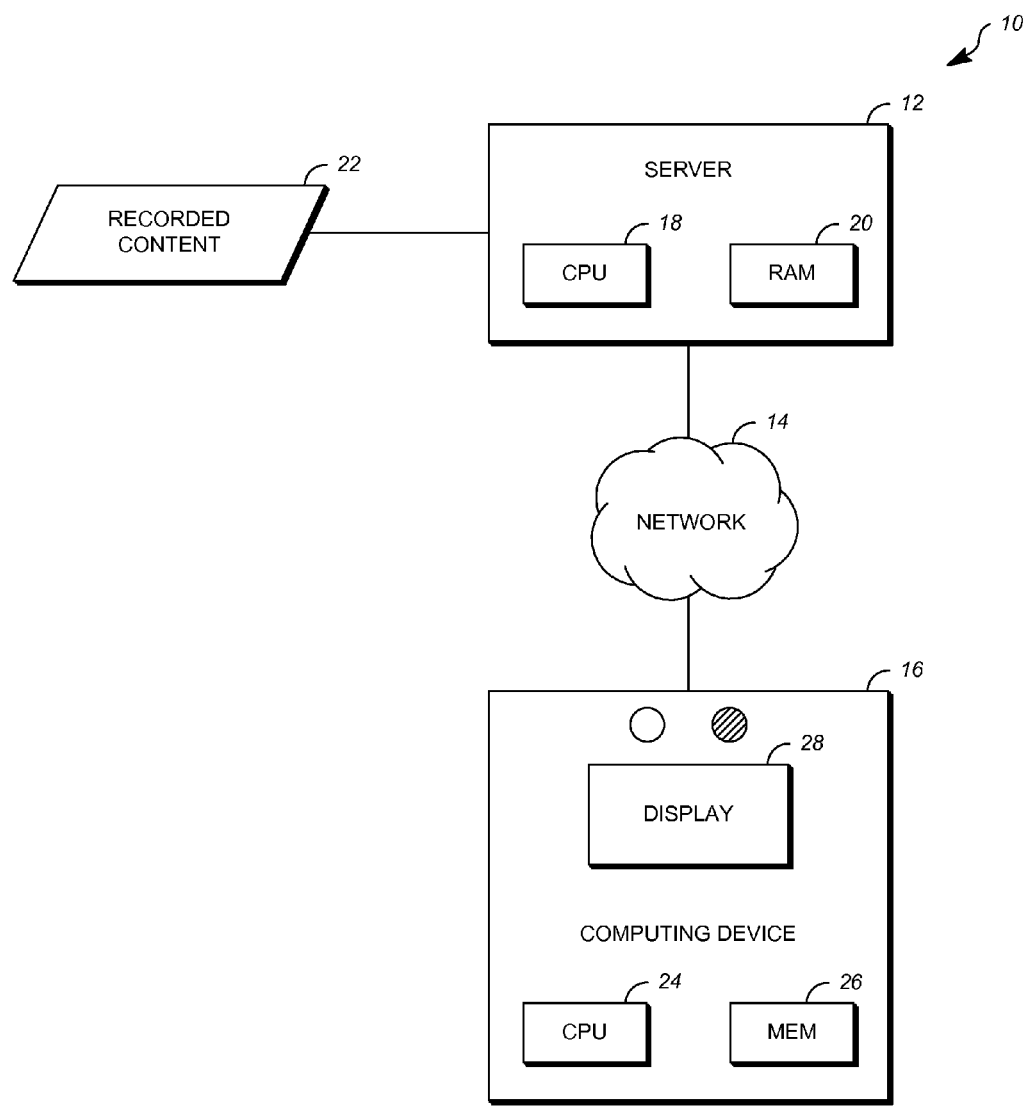
FIG. 1 is a block diagram of a multi-device video communication system.

FIG. 1 is a block diagram of a multi-device video communication system 10 in accordance with one implementation. The system 10 can include a server 12, a network 14, and a computing device 16.

The server 12 can include a processor such as central processing unit (CPU) 18 and a memory 20. In some embodiments, the server 12 can include two or more processors. Further, the server 12 can be implemented on two or more computing devices. In yet other embodiments, the server 12 can be implemented as a distributed system, using multiple computers and/or computing devices. In yet other embodiments, the server 12 can be built on a virtual machine, which itself can run on one or more computers and/or computing devices. The memory 20 can store data and program instructions that are used by the CPU 18. The server 12 can, for example, receive recorded content 22 from a plurality of multi-device video communication sessions as described in one of the below methods and transmit information about the recorded content 22 to the computing device 16 over the network 14.

The network 14 can put the server 12 in communication with the computing device 16 for transmitting information between the server 12 and the computing device 16.

The computing device 16 can include a processor such as CPU 24 and a memory 26. The memory 26 can store data and program instructions that are used by the CPU 24. The computing device 16 can also include or be in communication with one or more output devices, such as display 28. The display 28 can enable a device user of the computing device 16 to view recorded content 22 from multi-device video communication sessions transferred to the computing device 16 from the server 12. An example of the computing device 16 is further described in FIG. 2.

Figure 2:
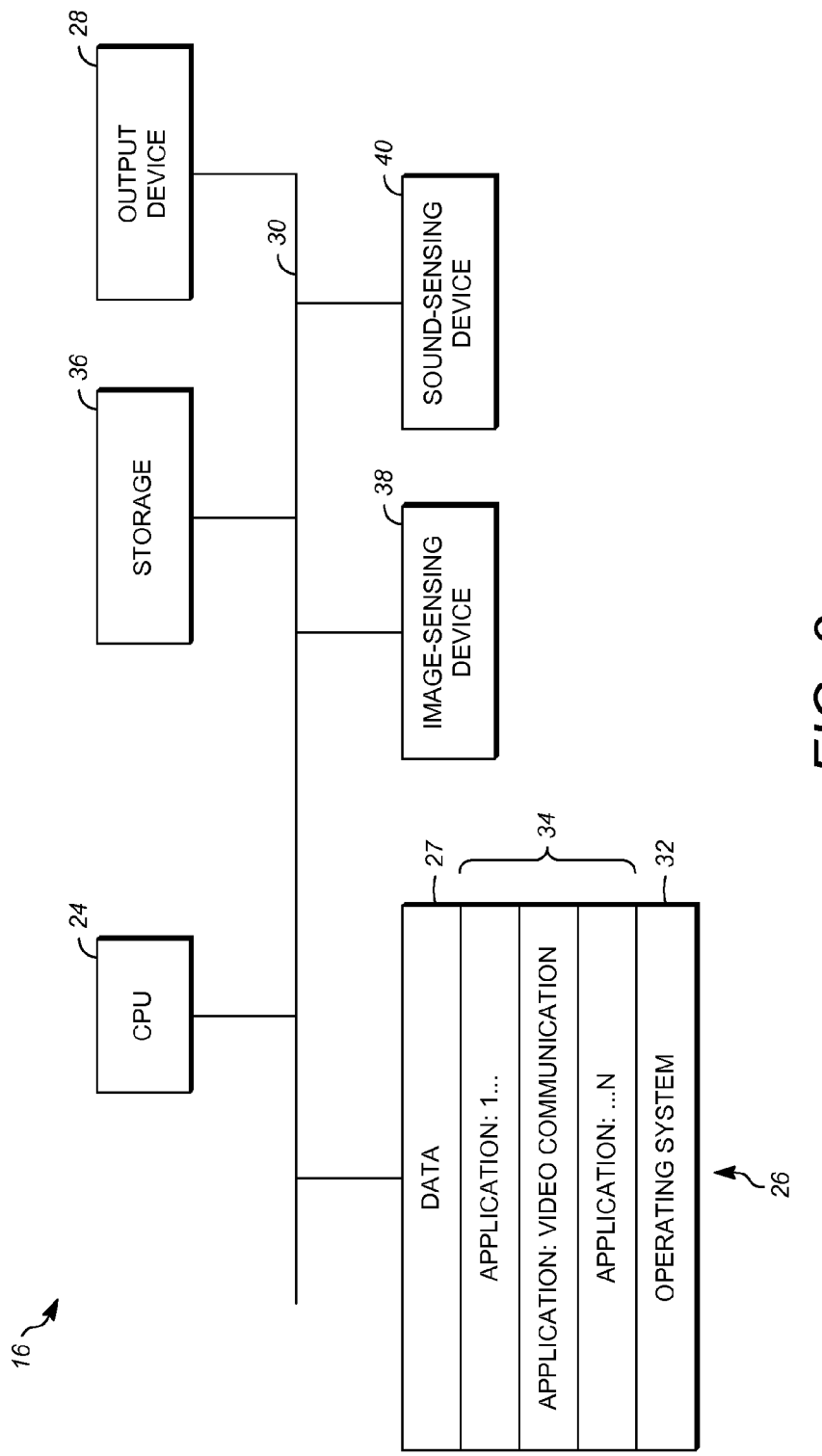
FIG. 2 is a block diagram showing an example of a computing device.

FIG. 2 is a block diagram of the example computing device 16 of FIG. 1. The computing device 16 can be in the form of a computing system including multiple computing devices, or in the form of a single computing device, for example, a mobile phone, a tablet computer, a laptop computer, a notebook computer, a desktop computer, a television with one or more processors embedded therein and/or coupled thereto, and the like.

The CPU 24 in the computing device 16 can be a conventional central processing unit. Alternatively, the CPU 24 can be any other type of device, or multiple devices, capable of manipulating or processing information now-existing or hereafter developed, including, for example, optical processors, quantum and/or molecular processors, general purpose processors, special purpose processors, IP cores, ASICS, programmable logic arrays, programmable logic controllers, microcode, firmware, microcontrollers, microprocessors, digital signal processors, memory, or any combination of the foregoing. In the claims, the term "processor" should be understood as including any of the foregoing, either singly or in combination. Although the disclosed embodiments can be practiced with a single processor as shown, e.g. CPU 24, advantages in speed and efficiency can be achieved using more than one processor.

The memory 26 in the computing device 16 can be a random access memory device (RAM). Any other suitable type of storage device can be used as the memory 26. The memory 26 can include code and data 27 that is accessed by the CPU 24 using a bus 30. The memory 26 can further include an operating system 32 and application programs 34, the application programs 34 including programs that permit the CPU 24 to perform the methods described here. For example, the application programs 34 can include applications 1 through N which further include a video communication application that performs the methods described here. The computing device 16 can also include a secondary storage 36, which can, for example, be a memory card used with a mobile computing device 16. Because the video communication sessions may contain a significant amount of information, they can be stored in whole or in part in the secondary storage 36 and loaded into the memory 26 as needed for processing.

The computing device 16 can also include one or more output devices, such as the display 28, which can be a touch sensitive display that combines a display with a touch sensitive element that is operable to sense touch inputs. The display 28 can be coupled to the CPU 24 via the bus 30. Other output devices that permit a user to program or otherwise use the computing device 16 can be provided in addition to or as an alternative to the display 28. When the output device is or includes a display, the display can be implemented in various ways, including by a liquid crystal display (LCD) or a cathode-ray tube (CRT) or light emitting diode (LED) display, such as an OLED display.

The computing device 16 can also include or be in communication with an image-sensing device 38, for example a camera, or any other image-sensing device 38 now existing or hereafter developed that can sense the image of a device user operating the computing device 16. The image-sensing device 38 can be positioned such that it is directed toward a device user that is operating the computing device 16. For example, the position and optical axis of the image-sensing device 38 can be configured such that the field of vision includes an area that is directly adjacent to the display 28, from which the display 28 is visible. The image-sensing device 38 can be configured to receive images, for example, of the face of a device user while the device user is operating the computing device 16.

The computing device 16 can also include or be in communication with a sound-sensing device 40, for example a microphone, or any other sound-sensing device now existing or hereafter developed that can sense the sounds made by the device user operating the computing device 16. The sound-sensing device 40 can be positioned such that it is directed toward the device user operating the computing device 16. The sound-sensing device 40 can be configured to receive sounds, for example, speech or other utterances made by the device user while the device user operates the computing device 16.

Although FIGS. 1 and 2 depict the CPUs 18, 24 and the memories 20, 26 of the server 12 and the computing device 16 as being integrated into single units, other configurations can be utilized. The operations of the CPUs 18, 24 can be distributed across multiple machines (each machine having one or more of processors) which can be coupled directly or across a local area or other network. The memories 20, 26 can be distributed across multiple machines such as network-based memory or memory in multiple machines performing the operations of the server 12 and computing device 16. Although depicted here as a single bus, the bus 30 of the computing device 16 can be composed of multiple buses. Further, the secondary storage 36 can be directly coupled to the other components of the computing device 16 or can be accessed via a network and can comprise a single integrated unit such as a memory card or multiple units such as multiple memory cards. The server 12 and the computing device 16 can thus be implemented in a wide variety of configurations.

A plurality of computing devices similar to the computing device 16 described in FIGS. 1 and 2 can communicate with the multi-device video communication system 10 of FIG. 1 and provide recorded content 22 for use in multi-device video communication sessions. Multi-device video communication sessions allow multiple devices to communicate recorded content 22 enabling communication between the device users of the multiple devices. The multi-device video communication system 10 of FIG. 1 can also receive recorded content 22 from any other source. An example multi-device video communication session is described in FIG. 3.

Figure 3:
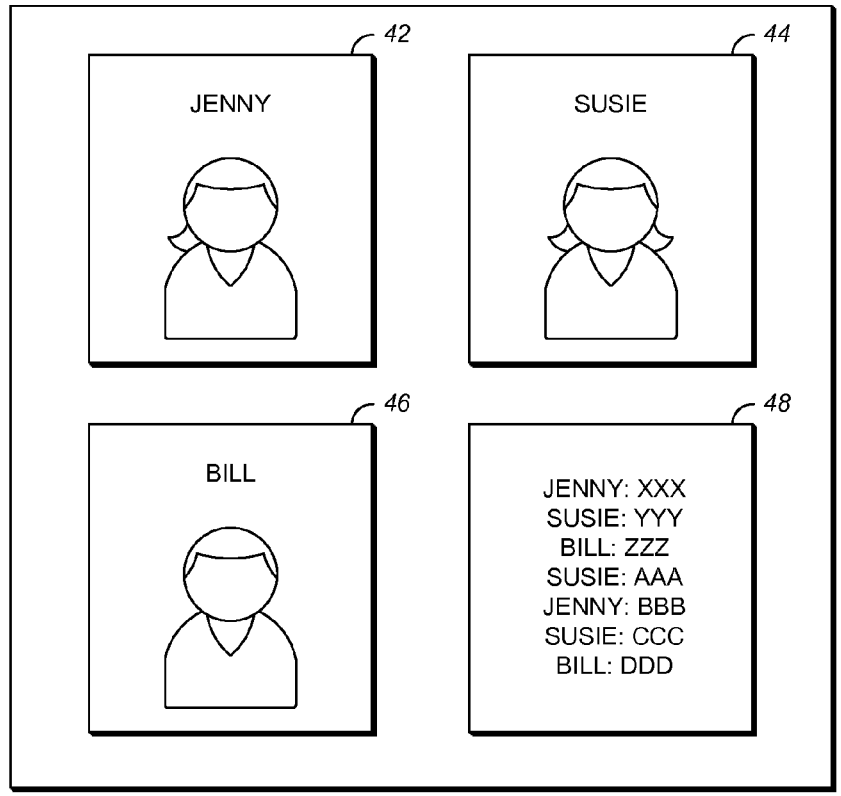
FIG. 3 is an illustration showing an example operation of a multi-device video communication session as displayed on the display screen of a computing device.

FIG. 3 is an illustration showing an example operation of a multi-device video communication session as displayed on the display of a computing device such as computing device 16. Several computing devices can participate in the multi-device video communication session, and content recorded by each computing device can be received by the multi-device video communication system 10 of FIG. 1 for processing and display to the computing devices participating in the multi-device video communication session.

In this example illustration, three device users, Jenny, Susie, and Bill, are participants in a multi-device video communication session, each participating from a separate computing device. Jenny, Susie, and Bill each have computing devices including or in communication with image-sensing devices, sound-sensing devices, and video communication applications. Jenny, Susie, and Bill's computing devices can record content, and the recorded content can include an audio component and a video component.

For example, Jenny, Susie, and Bill can each join the same multi-device video communication session from their respective computing devices through a video communication application. Each computing device can include or be in communication with a camera and microphone capable of recording images and sounds from Jenny, Susie, and Bill, respectively. The multi-device video communication session can be arranged using the recorded content from Jenny, Susie, and Bill and playing it back to the multi-device video communication session participants.

In the example multi-device video communication session shown in FIG. 3, the video component of the recorded content from Jenny's computing device, Jenny's video 42, is displayed in the top left corner. The video component of the recorded content from Susie's computing device, Susie's video 44, is displayed in the top right corner. Finally, the video component of the recorded content from Bill's computing device, Bill's video 46, is displayed in the bottom left corner.

The recorded content from Jenny, Susie, and Bill's computing devices also includes audio content. The recorded audio content can be processed into a transcript for the multi-device video communication session, with each participant identified in the transcript and associated with the text representing speech and other utterances made by the given participant. The transcript can include identifiers for Jenny, Susie, and Bill in the form of their names, or in any other form capable of identifying the source of the recorded audio content. The transcript can also include text associated with the speech and utterances made by Jenny, Susie, and Bill, respectively, during the multi-device video communication session. The transcript can also include time stamps or other devices associated with the text that enable identification of the timing of the speech or utterances made in respect to the rest of the transcript.

The transcript including the processed recorded audio content received from the participants can be displayed within the multi-device video communication session. For example, the transcript 48 can be displayed in the lower right corner of the multi-device video communication session shown in FIG. 3. In some implementations, the transcript 48 is not displayed within the multi-device video communication session. Time stamps or other devices associated with timing of the speech and utterances made by the participants can be included in the transcript 48 and can be used for further processing of the transcript as described below. In some implementations, the time stamps or other devices associated with the timing of the speech and utterances can be included in the display of the transcript 48. A processed version of the transcript 48 including only a portion of the transcript 48 can be displayed within the multi-device video communication session. An example of a processed portion of the transcript 48 is described in FIG. 4.

In another example (not shown), one or more of the device users taking part in the multi-device video communication session can provide only audio content, not video content. For example, one of the device users can be operating a device with a microphone, but no camera. The transcript can still be processed using the recorded audio content received from all of the participants and be displayed within the multi-device video communication session to those participants with video capabilities.

Figure 4:
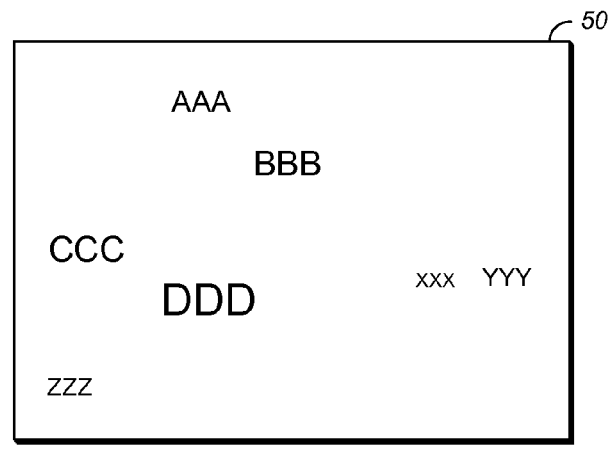
FIG. 4 is an illustration of a word cloud generated from the example multi-device video communication session of FIG. 3.

FIG. 4 is an illustration of a word cloud 50 generated from the example multi-device video communication session of FIG. 3. As described above, the textual transcript 48 generated from the speech and utterances of the participants in the multi-device video communication session can include time stamps or other devices associated with the text enabling identification of the time the speech or utterance occurred within the multi-device video communication session. The text associated with time stamps or other devices identifying timing can be processed for visual representation as a word cloud 50 using factors such as frequency of occurrence of the text, filtering of common text, categorization of text within common topics, confidence level of recognition of the text, the number of different speakers using the text, the popularity of the text in reference to a social media website, the length of the text, or any other factors that allow weighting of text for representation within the word cloud 50.

The processed text from the transcript 48 can be displayed in the word cloud 50 using a variety of formats and techniques including alphabetization, font size differences for emphasis, and color differences for emphasis, or any other format that provides distinction to the text within the word cloud 50. Because text can be associated with time stamps, the content of the word cloud 50 can vary depending on which portion of the transcript 48 is being represented within the word cloud 50. The word cloud 50 can also be displayed as a summary of the transcript 48 as a whole instead of a visualization that changes depending on which portion of the transcript 48 is being represented. The word cloud 50 can also be recorded and replayed at the option of the device user, allowing the device user to review the conversation taking place in the multi-device video communication session.

The word cloud 50 shown in FIG. 4 can be displayed in addition to or in place of the transcript 48 in the multi-device communication session of FIG. 3. The word cloud 50 can be generated from the transcript 48 shown in FIG. 3 and can be alphabetized, with font size used to show weighting of certain text indicating that some text is weighted more heavily than other text depending on a given factor. For example, in the word cloud 50, the text "DDD" and "BBB" is emphasized by the larger size of font as compared to the text "XXX" and "ZZZ." Word clouds such as word cloud 50 can be used to pique the interest of a device user seeking to join a multi-device video communication session as described in FIG. 5.

Figure 5:
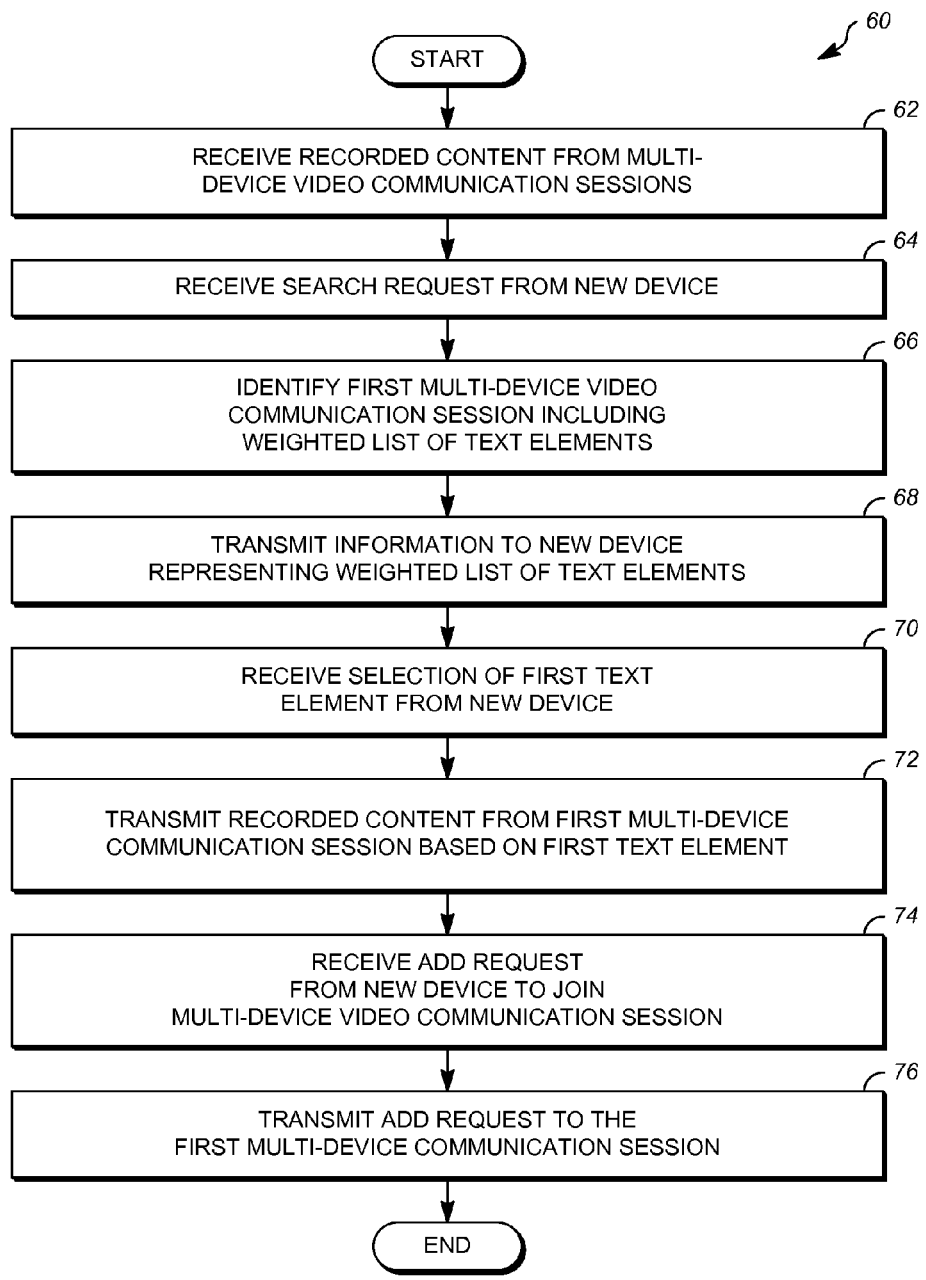
FIG. 5 is a flow chart showing a process for adding a computing device to a multi-device video communication session.

FIG. 5 is a flow chart showing a process 60 for adding a computing device 16 to a multi-device video communication session. In process 60, the computing device 16 can be in communication with the multi-device video communication system 10 as shown in FIG. 1.

In stage 62, the server 12 can receive recorded content 22 from a plurality of multi-device video communication sessions. For example, the multi-device video communication session shown in FIG. 3 including Jenny, Susie, and Bill can include audio content and video content being transmitted to the server 12 for purposes of transmitting the recorded content 22 between Jenny, Susie, and Bill's computing devices. The server 12 can also generate a transcript 48 from the audio component of the recorded content 22 for display to the participants of the in-progress multi-device video communication session or for use in identifying the multi-device video communication session.

In stage 64, the server 12 can receive a search request from the computing device 16. The search request can include text, images, video content, and/or audio content of interest to a device user of the computing device 16. The device user can submit the search request to identify a multi-device video communication session that would interest the device user in order for the device user to request to join the in-progress multi-device video communication session as a participant.

In stage 66, the server 12 can identify a first multi-device video communication session from the plurality of multi-device video communication sessions transmitting recorded content 22 to the server 12 based on the search request from the computing device 16. The first multi-device video communication session can include a weighted list of text elements derived from the transcript corresponding to the audio component of the first multi-device video communication session. The weighted list of text elements can be in the form of a word cloud.

For example, the first multi-device video communication session identified by the server 12 can be the multi-device video communication session shown in FIG. 3 including Jenny, Susie, and Bill as participants. The transcript of the first multi-device video communication session can be transcript 48 shown in FIG. 3. The word cloud of the first multi-device video communication session can be word cloud 50 shown in FIG. 4. The text, images, video content, and/or audio content of interest to the device user of the computing device 16 can be compared to the weighted list of text elements in the word cloud 50 to determine whether there is any similar or common content in the search request and word cloud 50.

In stage 68, the server 12 can transmit information based on the weighted list of text elements to the computing device 16 for causing the computing device 16 to display a representation of the weighted list of text elements to the device user. The representation of the weighted list of text elements can be a word cloud. For example, if the search request sent from the computing device 16 is compared to the first multi-device video communication session and similar or common content is identified, the server 12 can transmit the word cloud 50 shown in FIG. 4 to the computing device 16 for display to the device user. The word cloud 50 can give the device user an understanding of the content of the audio component of the transcript 48 of the first multi-device video communication session shown in FIG. 3.

In stage 70, the server can receive a selection from the computing device 16 corresponding to a first text element from the weighted list of text elements. For example, once the word cloud 50 as shown in FIG. 4 is displayed to the device user of the computing device 16, the device user can select a text element within the word cloud 50. Once the device user selects the text element, an element having interest to the device user, for example, an indication of the selection can be sent to the server 12.

In stage 72, the server 12 can transmit at least a portion of the recorded content from the first multi-device video communication session to the computing device based on the first text element. The at least a portion of the recorded content can be at least a portion of the transcript corresponding to the audio component of the first multi-device video communication session. The at least a portion of the recorded content can be at least a portion of the video component and at least a portion of the audio component of the first multi-device video communication session.

For example, if the server 12 receives indication that the device user of computing device 16 has selected "DDD" from the word cloud 50 as shown in FIG. 4, the server 12 can transmit several portions of the transcript 48 as text snippets, or text strings that include "DDD" within surrounding text, to the computing device 16 for display to the device user. As another example, the server 12 can transmit at least a portion the recorded content, the audio component and video component, of the first multi-device video communication session that includes one or more of the participants uttering "DDD." The portions of the transcript 48 or recorded content including the first text element can allow the device user of the computing device 16 to understand the context of the use of "DDD" by the participants in the first multi-device video communication session.

In stage 74, the server 12 can receive an add request from the computing device 16 that the computing device 16 be added to the first multi-device video communication session. For example, once the device user reviews at least a portion of the recorded content, which can be a portion of the transcript 48 or a portion of the video component and audio component of the recorded content, the device user can send a request to the server 12 to be added to the first multi-device video communication session.

Figure 6:
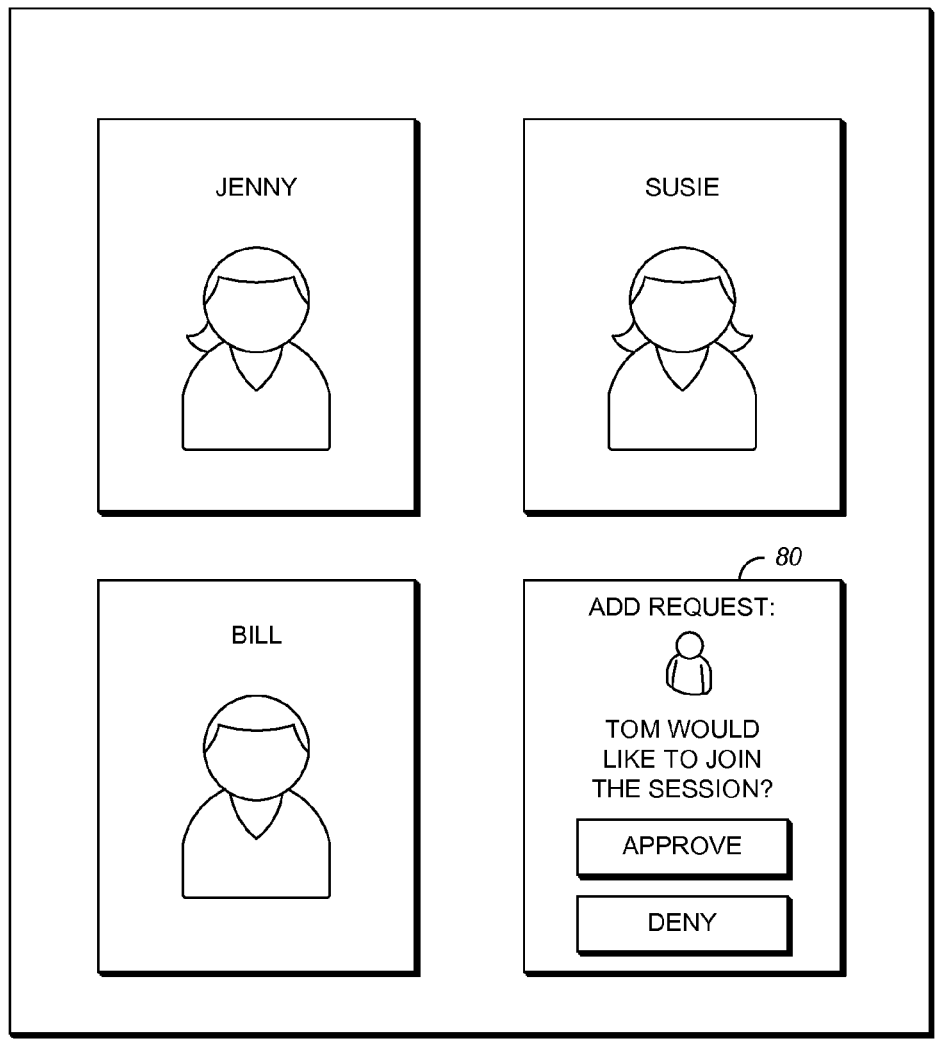
FIG. 6 is an illustration showing an operation in which a multi-device video communication session displays a representation of an add request.

In stage 76, the server 12 can transmit the add request to the first multi-device video communication session for causing the first multi-device video communication session to display a representation of the add request. An illustration of the display of an add request is shown in FIG. 6. After the add request is transmitted to the first multi-device video communication session, the process 60 ends.

The computations required for the process 60 can take place on the computing device 16 or on the server 12. If the computations required for the process 60 take place on the server 12, there is no requirement for the computing device 16 to have computation capabilities, only a requirement for an output device, such as display 28.

FIG. 6 is an illustration showing an operation in which a multi-device video communication session displays a representation of an add request. For example, the add request 80 shown in FIG. 6 can be displayed to the participants of the multi-device video communication session in place of the transcript 48 as shown in FIG. 3 or the word cloud 50 shown in FIG. 4. The add request 80 can allow one or more of the participants to decide whether the device user of computing device 16 should be added to the multi-device video communication session as a new participant.

The embodiments of the server 12 and the computing device 16 (and the algorithms, methods, instructions etc. stored thereon and/or executed thereby) can be realized in hardware including, for example, intellectual property (IP) cores, application-specific integrated circuits (ASICs), programmable logic arrays, optical processors, programmable logic controllers, microcode, firmware, microcontrollers, servers, microprocessors, digital signal processors or any other suitable circuit. In the claims, the term "processor" should be understood as encompassing any the foregoing, either singly or in combination. The terms "signal" and "data" are used interchangeably. Further, portions of server 12 and computing device 16 do not necessarily have to be implemented in the same manner.

In one embodiment, the server 12 and computing device 16 can be implemented using general purpose computers/processors with a computer program that, when executed, carries out any of the respective methods, algorithms and/or instructions described herein. In addition or alternatively, for example, special purpose computers/processors can be utilized which can contain specialized hardware for carrying out any of the methods, algorithms, or instructions described herein.

Further, all or a portion of embodiments of the present invention can take the form of a computer program product accessible from, for example, a non-transitory computer-usable or computer-readable medium. A non-transitory computer-usable or computer-readable medium can be any device that can, for example, tangibly contain, store, communicate, or transport the program for use by or in connection with any processor. The non-transitory medium can be, for example, an electronic, magnetic, optical, electromagnetic, or a semiconductor device. Other suitable mediums are also available. As an example, the process 60 can take the form of a computer program product that is accessible from the memory 20 of the server 12.

While this disclosure includes what is presently considered to be the most practical and preferred embodiments, it is to be understood that the disclosure is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

The invention claimed is:

1. A method comprising:
   receiving content from a plurality of multi-device video communication sessions;
   receiving a search request from the computing device;
   identifying a first multi-device video communication session from the plurality of multi-device video communication sessions based on the search request from the computing device wherein the first multi-device video communication session includes a list of text elements;
   transmitting information based on the list of text elements to the computing device for causing the computing device to display a representation of the list of text elements;
   receiving a selection from the computing device corresponding to a first text element from the list of text elements;
   transmitting at least a portion of the content from the first multi-device video communication session to the computing device based on the first text element; and
   in response to receiving an add request from the computing device, transmitting the add request to the first multi-device video communication session for causing the first multi-device video communication session to display a representation of the add request.

2. The method in claim 1 wherein the representation of the list of text elements is a word cloud.

3. The method in claim 1 wherein the content for each multi-device video communication session includes an audio component and a video component.

4. The method in claim 3 wherein the list of text elements is derived from a transcript corresponding to the audio component of the first multi-device video communication session.

5. The method in claim 4 wherein the portion of the content transmitted to the computing device is at least a portion of the transcript corresponding to the audio component of the first multi-device video communication session.

6. The method in claim 4 wherein the portion of the content transmitted to the computing device is at least a portion of the video component and at least a portion of the audio component of the first multi-device video communication session.

7. The method in claim 1 wherein the search request includes at least one of text, image, video, and audio of interest to a device user of the computing device.

8. The method in claim 7 wherein identifying the first multi-device video communication session includes comparing the at least one of text, image, video, and audio of interest in the search request to the list of text elements.

9. A method comprising:
   sending a search request from the computing device;
   receiving information from a multi-device video communication session based on the search request wherein the multi-device video communication session includes content and a list of text elements;
   displaying a representation of the list of text elements on the computing device;
   receiving a selection corresponding to a first text element from the list of text elements;
   receiving at least a portion of the content from the multi-device video communication session based on the first text element; and
   sending an add request from the computing device that the computing device be added to the multi-device video communication session.

10. The method in claim 9 wherein the representation of the list of text elements is a word cloud.

11. The method in claim 9 wherein the content of the multi-device video communication session includes an audio component and a video component.

12. The method in claim 11 wherein the list of text elements is derived from a transcript corresponding to the audio component of the multi-device video communication session.

13. The method in claim 12 wherein the portion of the content is at least a portion of the transcript corresponding to the audio component of the multi-device video communication session.

14. The method in claim 12 wherein the portion of the content is at least a portion of the video component and at least a portion of the audio component of the multi-device video communication session.

15. The method in claim 9 wherein the search request includes at least one of text, image, video, and audio of interest to a device user of the computing device.

16. The method in claim 15 wherein identifying the multi-device video communication session includes comparing the at least one of text, image, video, and audio of interest in the search request to the list of text elements.

17. A multi-device video communication system, comprising:
 a server configured to communicate with a computing device, the server including:
 a memory; and
 one or more processors wherein the one or more processors are configured to execute instructions stored in the memory to:
  receive content from a plurality of multi-device video communication sessions;
  receive a search request from the computing device;
   identify a first multi-device video communication session from the plurality of multi-device video communication sessions based on the search request from the computing device wherein the first multi-device video communication session includes a list of text elements;
   transmit information based on the list of text elements to the computing device for causing the computing device to display a representation of the list of text elements;
   receive a selection from the computing device corresponding to a first text element from the list of text elements;
   transmit at least a portion of the content from the first multi-device video communication session to the computing device based on the first text element;
   receive an add request from the computing device that the computing device be added to the first multi-device video communication session; and
   transmit the add request to the first multi-device video communication session for causing the first multi-device video communication session to display a representation of the add request.

18. The multi-device video communication system of claim 17 wherein the representation of the list of text elements is a word cloud.

\* \* \* \* \*